United States Patent
Zhao

(10) Patent No.: US 9,217,909 B2
(45) Date of Patent: Dec. 22, 2015

(54) DISPLAY PANEL AND DISPLAY APPARATUS HAVING THE DISPLAY PANEL

(71) Applicant: Boe Technology Group Co., Ltd., Beijing (CN)

(72) Inventor: Weili Zhao, Beijing (CN)

(73) Assignee: Boe Technology Group Co., Ltd, Beijing (CN)

( * ) Notice: Subject to any disclaimer, the term of this patent is extended or adjusted under 35 U.S.C. 154(b) by 0 days.

(21) Appl. No.: 14/098,219

(22) Filed: Dec. 5, 2013

(65) Prior Publication Data

US 2014/0160407 A1 Jun. 12, 2014

(30) Foreign Application Priority Data

Dec. 12, 2012 (CN) .......................... 2012 1 0536814

(51) Int. Cl.
- *G02F 1/29* (2006.01)
- *G02F 1/1335* (2006.01)
- *G02F 1/1333* (2006.01)
- *G02F 1/137* (2006.01)

(52) U.S. Cl.
CPC .......... *G02F 1/292* (2013.01); *G02F 1/133377* (2013.01); *G02F 1/133553* (2013.01); *G02F 2001/13793* (2013.01); *G02F 2201/30* (2013.01)

(58) Field of Classification Search
CPC .................. G02F 2001/13793; G02F 2201/30; G02F 1/292
See application file for complete search history.

(56) References Cited

U.S. PATENT DOCUMENTS

| 2010/0079700 A1* | 4/2010 | Hasegawa et al. ............... 349/62 |
| 2011/0141421 A1* | 6/2011 | Lee et al. ....................... 349/138 |
| 2011/0234572 A1* | 9/2011 | Toko .............................. 345/211 |

(Continued)

FOREIGN PATENT DOCUMENTS

| CN | 102789087 A | 11/2012 |
| CN | 202929334 U | 5/2013 |

OTHER PUBLICATIONS

Boe Technology Group Co., Ltd. Blue Phase Liquid Crystal Display Device, Machine Translation of CN 202929334U from Google Patents website. All pages.*

(Continued)

*Primary Examiner* — Dennis Y Kim
(74) *Attorney, Agent, or Firm* — Kinney & Lange, P.A.

(57) ABSTRACT

The present application discloses a display panel, comprising: a first substrate, a second substrate, and a blue phase liquid crystal layer interposed between the first substrate and the second substrate. The first substrate and the second substrate are adapted to generate an electric field in a first direction perpendicular to the display panel. An optical path diverting device is provided between the first substrate and the second substrate, the optical path diverting device is configured so that a light entering the blue phase liquid crystal layer in the first direction from the first substrate is diverted to propagate in the blue phase liquid crystal layer in a second direction parallel to the display panel, and then the light propagating in the second direction is diverted to pass through the blue phase liquid crystal layer and exit from the second substrate in the first direction. According to the present invention, by providing an optical path diverting device in the liquid crystal cell, the display panel can perform normal display even under a vertical electric field, and thus solves the problem that the driving voltage is too large by using a lateral electric field.

12 Claims, 3 Drawing Sheets

(56) References Cited

U.S. PATENT DOCUMENTS

2011/0249229 A1* 10/2011 Kubota et al. .................. 349/141
2012/0105751 A1* 5/2012 Mao et al. ........................ 349/33
2013/0016312 A1* 1/2013 Kim et al. ........................ 349/97
2013/0335692 A1* 12/2013 Chen et al. ..................... 349/158

OTHER PUBLICATIONS

Liu et al., "Blue-phase LCD device and display equipment", Machine translation of CN 102789087 A from Google Patents Website, All pages.*

English translation of Office Action dated Sep. 28, 2014, received for corresponding Chinese Application No. 201210536814.8.

English translation of second Office Action dated Feb. 11, 2015, received for corresponding Chinese Application No. 201210536814.8.

Third Office Action dated Jul. 3, 2015 in corresponding Chinese Application No. 201210536814.8.

Chinese Decision of Rejection of corresponding Chinese application mailed on Oct. 21, 2015.

* cited by examiner

DISPLAY PANEL AND DISPLAY APPARATUS HAVING THE DISPLAY PANEL

CROSS-REFERENCE TO RELATED APPLICATION

This application claims the benefit of Chinese Patent Application No. 201210536814.8 filed on Dec. 12, 2012 in the State Intellectual Property Office of China, the whole disclosure of which is incorporated herein by reference.

BACKGROUND OF THE INVENTION

1. Field of the Invention

The present invention relates to the field of LCD (liquid crystal display) technology, more particularly to a display panel and a display apparatus having the same.

2. Description of the Related Art

Blue phase liquid crystal is a special phase in liquid crystal. When no voltage is applied, the blue phase liquid crystal can be regarded as having an equivalent spherical shape and assume optical isotropy without causing optical path difference in the light passing it; when voltage is applied, the blue phase liquid crystal can be regarded as being stretched into an equivalent particulate shape having a major axis consistent with the electric field and assume optical anisotropy and will cause optical path difference in the light passing it according to birefringence principle (Kerr effect). The blue phase liquid crystal has the following advantages: (1) rapid responsive speed, typically less than 1 ms in response time; thus a color film can be omitted, and a field sequential color control can be realized; (2) it can use electric field to induce birefringence principle directly to realize display without an alignment layer and rubbing treatment; (3) when no voltage is applied, the blue phase liquid crystal assumes isotropy without light leak in a dark state and with a wide viewing angle. Therefore, the blue phase liquid crystal are a kind of liquid crystal display material of good prospect for use.

However, since the light for a display passes through the liquid crystal cell perpendicularly, in order to induce birefringence, the blue phase liquid crystal must be laterally stretched. For that reason, the existing blue phase liquid crystal display apparatus basically uses a lateral electric field in parallel with the display panel to drive the blue phase liquid crystal, such as an in-plane switching (IPS) mode. In this mode, the blue phase liquid crystal is driven and stretched near a pixel electrode and a common electrode in the same plane so as to induce anisotropy. Since the lateral dimensions of the blue phase liquid crystal in the length and width directions are a number of times larger than their dimension in the thickness direction, under the same voltage conditions, the intensity of a lateral electric field (in parallel with the display panel) is a number of times less than the intensity of a perpendicular electric filed (perpendicular to the display panel), and the lateral electric field is not able to penetrate throughout the whole liquid crystal layer. Therefore, the drive by a lateral electric field needs a large driving voltage. The existing blue phase liquid crystal display apparatus involves a problem of having too large a driving voltage. Although a perpendicular electric filed (perpendicular to the display panel) needs a much smaller driving voltage, there is a problem that the perpendicular electric filed is not compatible with the perpendicular light (perpendicular to the display panel).

SUMMARY OF THE INVENTION

The present invention has been made to overcome or alleviate at least one aspect of the above mentioned disadvantages in the prior art.

Accordingly, according to a first aspect of the present invention, there is provided a display panel, comprising: a first substrate, a second substrate, and a blue phase liquid crystal layer interposed between the first substrate and the second substrate. The first substrate and the second substrate are adapted to generate an electric field in a first direction perpendicular to the display panel. An optical path diverting device is provided between the first substrate and the second substrate, the optical path diverting device is configured so that a light entering the blue phase liquid crystal layer in the first direction from the first substrate is diverted to propagate in the blue phase liquid crystal layer in a second direction parallel to the display panel, and then the light propagating in the second direction is diverted to pass through the blue phase liquid crystal layer and exit from the second substrate in the first direction.

According to another aspect of the present invention, there is provided with a display apparatus comprising the display panel according to the first aspect of the present invention.

BRIEF DESCRIPTION OF THE DRAWINGS

The above and other features of the present invention will become more apparent by describing in detail exemplary embodiments thereof with reference to the accompanying drawings, in which.

Figure 1A:
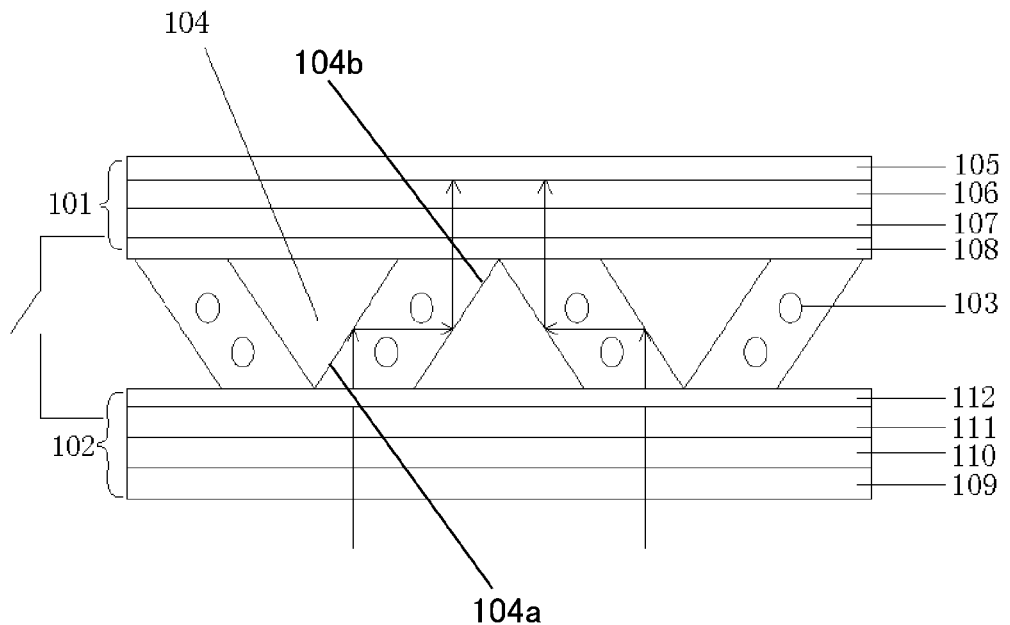
FIG. 1a is a schematic view showing the structure of a display panel with no electric filed being applied thereto according to a first embodiment of the present invention.

LIST OF REFERENCE NUMERALS 101 upper substrate
102 lower substrate
103 blue phase liquid crystal
104 optical member
105 upper polarizing film
106 upper quarter wave plate
107 color film substrate
108 common electrode
109 lower polarizing film
110 lower quarter wave plate
111 TFT substrate
112 pixel electrode

DETAILED DESCRIPTION OF PREFERRED EMBODIMENTS OF THE INVENTION

Exemplary embodiments of the present disclosure will be described hereinafter in detail with reference to the attached drawings, wherein the like reference numerals refer to the like elements. The present disclosure may, however, be embodied
} in many different forms and should not be construed as being limited to the embodiment set forth herein; rather, these embodiments are provided so that the present disclosure will be thorough and complete, and will fully convey the concept of the disclosure to those skilled in the art.

The First Embodiment

Figure 1B:
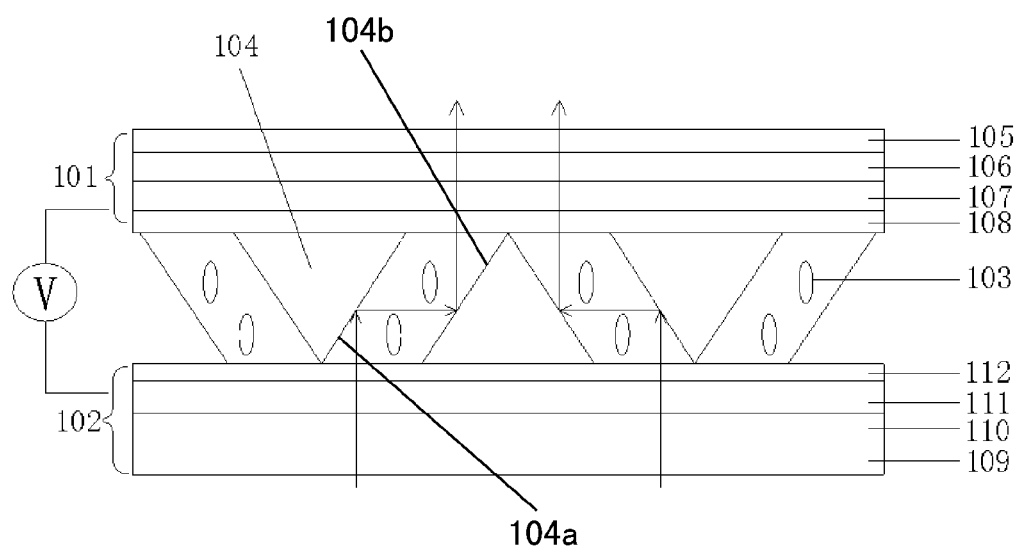
FIG. 1b is a schematic view showing the structure of the display panel shown in FIG. 1a with electric filed being applied thereto.

As shown in FIG. 1a-1b, the display panel according to the first embodiment of the present invention comprises a lower substrate (or referred as a first substrate) 102, an upper substrate (or referred as a second substrate) 101, and a blue phase liquid crystal layer 103 interposed between the upper substrate 101 and the lower substrate 102. A plurality of optical members 104 are disposed between the upper substrate 101 and the lower substrate 102 and are equally spaced apart from one another in the horizontal direction (referred to as a second direction). Each of the optical members 104 is shaped as an isosceles right-angled triangle, with the two right angle sides of the isosceles right-angled triangle extending between the upper substrate and the lower substrate and serving as light reflecting surfaces, and the apex of the right angle is located on one of the upper substrate 101 and the lower substrate 102, and the base side subtending the apex of the right angle is located on the other of the upper substrate 101 and the lower substrate 102. Two adjacent isosceles right-angled triangle-shaped optical members 104 are inverted with each other. Among adjacent light reflecting surfaces 104a and 104b of two adjacent optical members 104, one light reflecting surface 104a forms an 45° angle with respect to the lower substrate 102, and the other reflecting surface 104b forms an 135° angle with respect to the lower substrate 102. In this way, the adjacent light reflecting surfaces 104a and 104b of two adjacent optical members 104 are parallel with each other so as to consecutively reflect the light entering the display panel from the lower substrate 102.

Specifically, when the light enters the display panel through the lower substrate 102, the light reflecting surface 104a of one optical member 104 reflects the light for the first time; the reflected light propagates in the blue phase liquid crystal layer 103 between the optical members 104 in a horizontal direction (assuming that the upper and lower substrates are disposed horizontally and the light enters the display panel upward in a vertical direction perpendicular to the display panel); the horizontal light is incident on the light reflecting surface 104b of the adjacent optical member 104 and is reflected for the second time; the reflected light reflected by the light reflecting surface 104b changes its direction to propagate upward in a vertical direction and exits from the upper substrate 101. With the configuration of the optical members 104, when a vertical electric field (perpendicular to the substrate or the display panel) is applied, the blue phase liquid crystal is stretched vertically. Due to the characteristics of the blue phase liquid crystal, when the light after the first reflection passes through the vertically stretched blue phase liquid crystal, the light changes its polarization direction and emits out of the display panel after the second reflection. In this way, the purpose of controlling the transmissibility of the light is realized by adjusting the differences of the polarization directions of the incident light and the exit light, and different gray levels can be displayed. Because a vertical electric filed is employed to drive the liquid crystal, the problem of large driving voltage occurred when a horizontal electric field is used is avoided.

In the present embodiment, as shown in figures 1a and 1b, the vertical section of each optical member 104 is shaped as an isosceles right-angled triangle. Each optical member 104 has two light reflecting surfaces, and the two adjacent light reflecting surfaces 104a and 104b of two adjacent optical members 104 are parallel with each other. The horizontal projections of the two adjacent light reflecting surfaces 104a and 104b on a plane parallel to the display panel are connected end to end with each other. That is, the horizontal projections of the two adjacent optical members 104 can forms a consecutive line such that the light enters the display panel from the lower substrate may exit from the upper substrate properly after two times of reflection.

In the present embodiment, as shown in figures 1a and 1b, the upper substrate may include a polarizing film 105, an upper quarter wave plate 106, a color film substrate 107 and a common electrode 108 in this order from the top to the bottom. The optical axis of the upper quarter wave plate 106 and the light transmission axis of the upper polarizing film forms an angle of 45°. The color film substrate 107 is provided with black matrixes (not shown). The optical members 104 contact with the area of the upper substrate corresponding to the black matrixes such that the introduction of the optical members 104 will not affect the normal light transmission in the area where the optical members 104 do not contact the upper substrate 101.

In the present embodiment, the lower substrate 102 includes a lower polarizing film 109, a lower quarter wave plate 110, a thin-film transistor (TFT) substrate 111 and a pixel electrode 112 in this order from the bottom to the top. The optical axis of the lower quarter wave plate 110 forms an angle of 45° with the transmission axis of the lower polarizing film 109, and the transmission axes of the upper polarizing film 105 and the lower polarizing film 109 are perpendicular to each other, and optical axes of the upper quarter wave plate 106 and the lower quarter wave plate 110 are also perpendicular to each other.

In the present embodiment, the optical members 104 are made of lightproof material, such as electric conductive material. Alternatively, the body of the optical members 104 may be made of other material, and reflecting films such as metal layers may then be coated on the body. The optical members 104 may be formed by patterning process. When the optical members 104 are made of conductive material, insulation layers should be added below the common electrode and above the pixel electrode respectively to prevent that the optical members electrically conduct the upper substrate and the lower substrate and cause short circuit; when the optical members 104 are made of non-conductive material, the insulation layers are not necessary.

In the present embodiment, the common electrode 108 and the pixel electrode 112 are plate electrodes disposed opposite to each other for providing vertical electric field.

The principle for controlling the display of the display panel by applying vertical electric field between the upper substrate and the lower substrate of the display panel to drive the blue phase liquid crystal will be described with reference to the figures in the following.

As shown in FIG. 1a, when no voltage is applied, the blue phase liquid crystal assumes isotropy and will not change the polarizing state of the light. The light from the backlight source emits on the display panel vertically via a light guide plate; the light becomes a linear polarized light of certain polarizing state, for example, 0° linear polarized light, after passing through the lower polarizing film; the light proceeds to pass through the lower quarter wave plate and change its phase by $\pi/2$ to become a left polarized light; the light proceeds to pass through the TFT substrate and the pixel electrode without phase change; then after the light enters the liquid crystal cell assuming isotropy, the light is reflected by the reflecting surfaces of the optical members 104 and changes its phase by $\pi/2$ to become a right polarized light;

since the reflecting surfaces of the optical member 104 form an angle of 45° or 135° with the horizontal direction, the reflected light will propagate horizontally through the isotropic blue phase liquid crystal; the light does not change its phase and is still right polarized light; the right polarized light irradiates on and reflected by the light reflecting surface of the adjacent optical member 104 and changes its phase by π to become a left polarized light; the reflected light propagates in a vertical direction, through the upper quarter wave plate and changes its phase by π/2; since the optical axes of the upper quarter wave plate and the lower quarter wave plate are perpendicular to each other, the light becomes 0° linear polarized light at this time; since the light transmission axes of the upper polarizing film and the lower polarizing film are perpendicular to each other, the 0° polarized light is just absorbed by the upper polarizing film and the display panel assumes black state.

As shown in FIG. 1b, when voltage is applied, the blue phase liquid crystal assumes anisotropy and is stretched vertically. Therefore, when the light passes the blue phase liquid crystal vertically, its phase does not change; when the light passes the blue phase liquid crystal horizontally, its phase changes. The light from the backlight source irradiates on the display panel vertically and passes through the lower substrate and experiences the same phase change as when no voltage is applied; the light emitting from the lower substrate is still a left polarized light; when the left polarized light enters the liquid crystal cell vertically, the vertically stretched blue phase liquid crystal does not change the polarized state of the light until the light is reflected by the light reflecting surfaces of the optical members 104 and changes its phase by t to become a right polarized light; the reflected light propagates horizontally through the anisotropic blue phase liquid crystal and produces an optical path difference δnd. According to Kerr effect, $\delta n=\lambda K E^2$ ($\lambda$ is the wavelength of the incident light, K is Kerr constant, E is electric field intensity and has a value derived by dividing the voltage U between the common electrode and the pixel electrode by the thickness d of the liquid crystal cell). For example, when $\delta nd=\lambda/2$ 时, after passing through the blue phase liquid crystal, the light changes its phase by π and the right polarized light becomes left polarized light; the light proceeds and irradiate on the light reflecting surfaces of the adjacent optical member 104 and change its phase again by π and becomes a right polarized light; similarly, because the light reflecting surfaces of the optical member 104 forms an angle of 45° or 135° with the horizontal direction, the reflected light propagates in the vertical direction and passes through the upper quarter wave plate and changes its phase by π/2; since the optical axes of the upper quarter wave plate 106 and the lower quarter wave plate 110 are perpendicular to each other, the light having passed through the upper quarter wave plate 106 becomes 90° linear polarized light; since the light transmission axes of the upper polarizing film and the lower polarizing film are perpendicular to each other, the 90° linear polarized light can pass through the upper polarizing film completely and the display panel assumes bright state. When different electric field intensities are obtained by applying voltages between the pixel electrode and the common electrode, the light phase is changed differently by the blue phase liquid crystal, thus a series of gray levels are obtained. As described above, when the optical path difference δnd=λ/2, the light passes through the display panel completely and the display panel assumes the brightest state.

The Second Embodiment

Figure 2A:
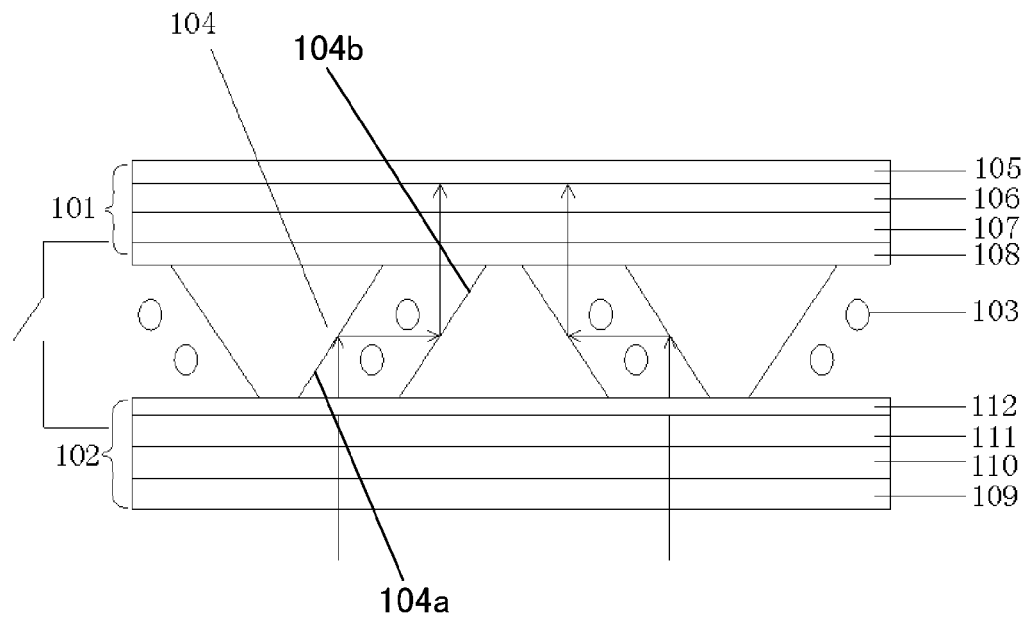
FIG. 2a is a schematic view showing the structure of a display panel with no electric filed being applied thereto according to a second embodiment of the present invention.
Figure 2B:
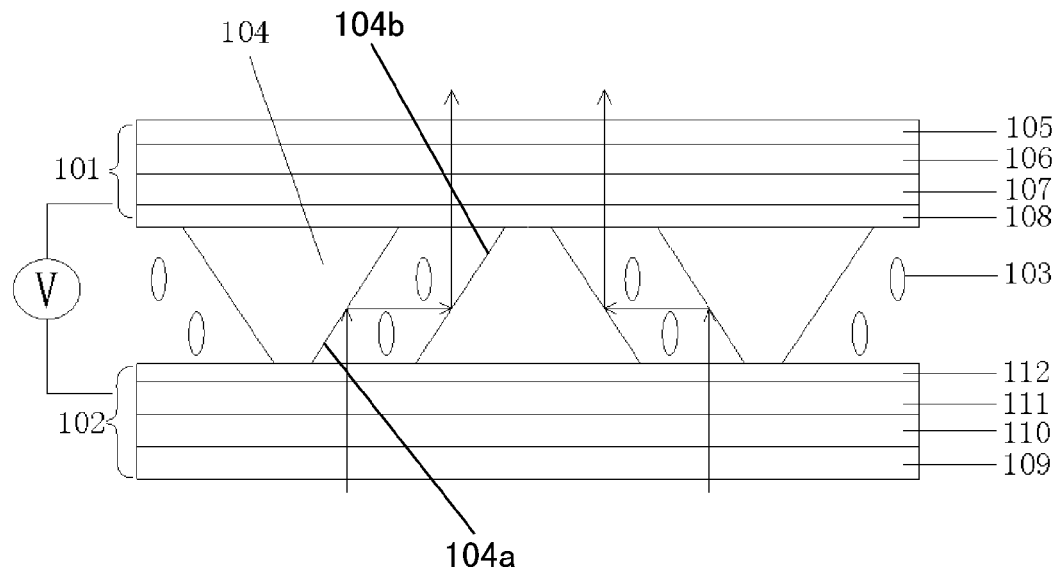
FIG. 2b is a schematic view showing the structure of the display panel as shown in FIG. 2a with electric filed being applied thereto.

As shown in FIGS. 2a-2b, in the second embodiment of the present invention, the vertical section of the optical member 104 has an isosceles trapezoid shape. The two parallel sides of the trapezoid are located on the upper and lower substrate respectively, and the other two sides are used as light reflecting surfaces. The adjacent isosceles trapezoid-shaped optical members 104 are inverted with each other. The two adjacent light reflecting surfaces of the two adjacent optical members are parallel to each other and forms an angle of 45° or 135° respectively with respect to the lower substrate. The horizontal projections of the adjacent light reflecting surfaces on a plane parallel to the display panel are connected end to end. The principle for showing brightness state and black state by the optical members and the other structure of the display panel according to the second embodiment are the same as those described in the first embodiment and thus the description thereof is omitted here.

In the solution of the second embodiment, because each optical member has an upper base surface which is absent in the optical member according to the first embodiment, the light transmission rate of the second embodiment is higher than the first embodiment.

The Third Embodiment

Figure 3A:
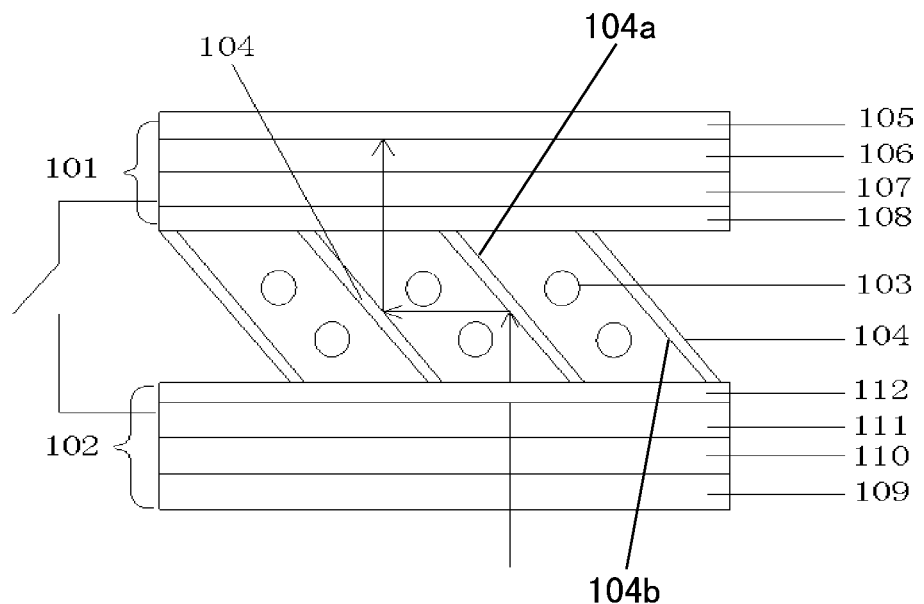
FIG. 3a is a schematic view showing the structure of a display panel with no electric filed being applied thereto according to a third embodiment of the present invention.
Figure 3B:
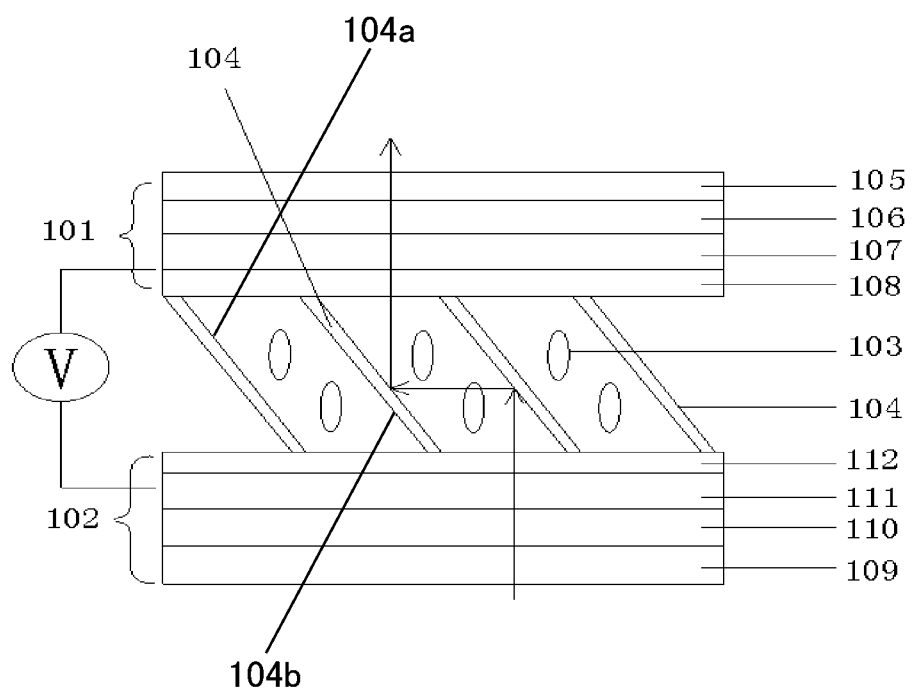
FIG. 3b is a schematic view showing the structure of the display panel as shown in FIG. 3a with electric filed being applied thereto.

As shown in FIGS. 3a-3b, according to the third embodiment of the present invention, a display panel comprises a upper substrate 101, a lower substrate 102 and a blue phase liquid crystal layer 103 between the upper substrate 101 and the lower substrate 102. There are a plurality of optical members 104 disposed between the upper substrate 101 and the lower substrate 102 and spaced apart from each other with equal distance. The light reflecting surfaces of the optical members 104 form an angle of 45° or 135° with respect to the upper substrate 101 for reflecting the light entering the display panel through the lower substrate 102.

In the present embodiment, the vertical section of the optical member 104 is of a parallelogram shape with first opposite sides and second opposite sides. The first opposite sides of the parallelogram are located on the upper substrate and the lower substrate respectively and the second opposite sides are used as light reflecting surfaces. All parallelogram-shaped optical members 104 are oriented in the same direction. The two adjacent light reflecting surfaces of the two adjacent optical members 104 are parallel to each other and forms an angle of 45° or 135° respectively with respect to the lower substrate. The horizontal projections of the adjacent optical members 104 on a plane parallel to the display panel are connected end to end. That is, the horizontal projections of the adjacent optical members 104 can be connected in a consecutive line such that the light enters the display panel from the lower substrate may exit from the upper substrate properly after two times of reflection.

In the present embodiment, as shown in FIGS. 3a and 3b, the upper substrate 101 may includes a polarizing film 105, an upper quarter wave plate 106, a color film substrate 107 and a common electrode 108 in this order from the top to the bottom. The optical axis of the upper quarter wave plate 106 and the light transmission axis of the upper polarizing film 105 forms an angle of 45°. The color film substrate 107 is provided with black matrixes (not shown). The non-reflecting surface of the optical members 104 contacts with the area of the upper substrate corresponding to the black matrixes such that the introduction of the optical members 104 will not affect the normal light transmission in the area where the optical members 104 do not contact the upper substrate 101.

In the present embodiment, the lower substrate 102 includes a lower polarizing film 109, a lower quarter wave plate 110, a thin-film transistor (TFT) substrate 111 and a pixel electrode 112 in this order from the bottom to the top. The optical axis of the lower quarter wave plate 110 forms an angle of 45° with respect to the transmission axis of the lower polarizing film 109. Further, the transmission axes of the upper polarizing film 105 and the lower polarizing film 109 are perpendicular to each other, and optical axes of the upper quarter wave plate 106 and the lower quarter wave plate 110 are also perpendicular to each other.

In the present embodiment, the optical members 104 are made of lightproof material, such as electric conductive material. Alternatively, the body of the optical members 104 may be made of other material, and reflecting films such as metal layers may then be coated on the reflecting surfaces of body in parallel with each other. The optical members 104 may be formed by patterning process. When the optical members 104 are made of conductive material, insulation layers should be added below the common electrode and above the pixel electrode respectively to prevent that the optical members electrically conduct the upper substrate and the lower substrate and cause short circuit; when the optical members 104 are made of non-conductive material, the insulation layers are not necessary.

In the present embodiment, the common electrode 108 and the pixel electrode 112 are plate electrodes disposed opposite to each other for providing vertical electric field.

The display of the display panel can be controlled by applying vertical electric field between the upper substrate and the lower substrate of the display panel to drive the blue phase liquid crystal. The principle for displaying the bright state and the black state is the same as those described in the first embodiment and thus the description thereof is omitted here.

In comparison with the first and the second embodiments, in the third embodiment, because the optical members are oriented in a single direction and the area in which the parallelogram contacts with the upper substrate is small, the light transmission rate is less affected and the display effect is better. However, the manufacture process for the first and second embodiments may be simpler than the third embodiment.

The above embodiments describe some illustrative structures of the optical members according to the present invention. However, a person skilled in the art would be appreciated that the structure of the optical member are not limited to the structures shown in the exemplary embodiments. According to other embodiments, the optical member 104 may be any structure having reflecting surfaces which forms an angle of 45° or 135° with the upper substrate and the lower substrate. Alternatively, other optical path diverting devices can be used, if only the device can change the vertical light incident on the lower substrate into horizontal light to pass through the blue phase liquid crystal and emit from the upper substrate vertically.

The Fourth Embodiment

According to the fourth embodiment of the present invention, there is provided with a display apparatus which comprises the display panel according to any one of the above embodiments.

The display apparatus may be a LCD apparatus, an electronic paper, a mobile phone, a tablet computer, a monitor, a notebook computer, a digital photo frame, a navigator and other produces or components which have display function.

According to the present invention, by providing a light path diverting device in the liquid crystal cell, the display panel can perform normal display even under a vertical electric field, and thus solves the problem that the driving voltage is too large by using a lateral electric field.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A display panel comprising:
   a first substrate,
   a second substrate, and
   a blue phase liquid crystal layer interposed between the first substrate and the second substrate,
   wherein the first substrate and the second substrate are adapted to generate an electric field in a first direction perpendicular to the display panel;
   wherein an optical path diverting device is provided between the first substrate and the second substrate, the optical path diverting device being configured so that:
      a light entering the blue phase liquid crystal layer in the first direction from the first substrate is diverted to propagate in the blue phase liquid crystal layer in a second direction parallel to the display panel, and then the light propagating in the second direction is diverted to pass through the blue phase liquid crystal layer and exit from the second substrate in the first direction;
   wherein the optical path diverting device comprises a plurality of optical members extended from the first substrate to contact the second substrate and spaced apart from each other without any connection point between any two adjacent optical members;
   wherein the plurality of optical members are disposed such that the blue phase liquid crystal filled between any two adjacent optical members;
   wherein each of the optical members has light reflecting surfaces extending between the first substrate and the second substrate;
   wherein two light reflecting surfaces belonging to any two adjacent optical members respectively and facing each other are parallel with each other, with one of the two light reflecting surfaces forming an angle of 45° or 135° with respect to one of the first substrate and the second substrate;
   and further wherein:
      a vertical section of each optical member in the first direction is shaped as an isosceles right-angled triangle;
      two right angle sides of the isosceles right-angled triangle serves as the light reflecting surfaces;
      an apex of the right angle is located on one of the first substrate and the second substrate, and a base side subtending the apex of the right angle is located on the other of the first substrate and the second substrate; and
      two adjacent isosceles right-angled triangle-shaped optical members are inverted with each other.

2. The display panel according to claim 1, wherein the horizontal projections of two adjacent light reflecting surfaces of any two adjacent optical members on a plane parallel to the display panel are connected end to end.

3. The display panel according to claim 1, wherein the first substrate includes a first polarizing film, a first quarter wave plate, a thin-film transistor (TFT) substrate and a pixel electrode in a direction from the first substrate to the second substrate.

4. The display panel according to claim 3, wherein the second substrate includes a second polarizing film, a second quarter wave plate, a color film substrate and a common electrode in a direction from the second substrate to the first substrate.

5. The display panel according to claim 4,
wherein light transmission axes of the first polarizing film and the second polarizing film are perpendicular to each other, and
wherein optical axes of the first quarter wave plate and the second quarter wave plate are perpendicular to each other.

6. The display panel according to claim 5,
wherein the optical axis of the first quarter wave plate forms an angle of 45° with respect to the light transmission axis of the first polarizing film, and
wherein the optical axis of the second quarter wave plate forms an angle of 45° with respect to the light transmission axis of the second polarizing film.

7. A display panel comprising:
a first substrate,
a second substrate, and
a blue phase liquid crystal layer interposed between the first substrate and the second substrate,
wherein the first substrate and the second substrate are adapted to generate an electric field in a first direction perpendicular to the display panel;
wherein an optical path diverting device is provided between the first substrate and the second substrate, the optical path diverting device being configured so that:
a light entering the blue phase liquid crystal layer in the first direction from the first substrate is diverted to propagate in the blue phase liquid crystal layer in a second direction parallel to the display panel, and then the light propagating in the second direction is diverted to pass through the blue phase liquid crystal layer and exit from the second substrate in the first direction;
wherein the optical path diverting device comprises a plurality of optical members extended from the first substrate to contact the second substrate and spaced apart from each other without any connection point between any two adjacent optical members;
wherein the plurality of optical members are disposed such that the blue phase liquid crystal filled between any two adjacent optical members;
wherein each of the optical members has light reflecting surfaces extending between the first substrate and the second substrate;
wherein two light reflecting surfaces belonging to any two adjacent optical members respectively and facing each other are parallel with each other, with one of the two light reflecting surfaces forming an angle of 45° or 135° with respect to one of the first substrate and the second substrate;
and further wherein:
a vertical section of each optical member in the first direction is shaped as an isosceles trapezoid;
two parallel sides of the isosceles trapezoid are located on the first and second substrates, respectively; and
the other two sides of the isosceles trapezoid are configured to the light reflecting surfaces; and
two adjacent isosceles trapezoid-shaped optical members are inverted with each other.

8. The display panel according to claim 7, wherein the horizontal projections of two adjacent light reflecting surfaces of any two adjacent optical members on a plane parallel to the display panel are connected end to end.

9. The display panel according to claim 7, wherein the first substrate includes a first polarizing film, a first quarter wave plate, a thin-film transistor (TFT) substrate and a pixel electrode in a direction from the first substrate to the second substrate.

10. The display panel according to claim 9, wherein the second substrate includes a second polarizing film, a second quarter wave plate, a color film substrate and a common electrode in a direction from the second substrate to the first substrate.

11. The display panel according to claim 10,
wherein light transmission axes of the first polarizing film and the second polarizing film are perpendicular to each other, and
wherein optical axes of the first quarter wave plate and the second quarter wave plate are perpendicular to each other.

12. The display panel according to claim 11,
wherein the optical axis of the first quarter wave plate forms an angle of 45° with respect to the light transmission axis of the first polarizing film, and
wherein the optical axis of the second quarter wave plate forms an angle of 45° with respect to the light transmission axis of the second polarizing film.

* * * * *